United States Patent
Anuff et al.

(10) Patent No.: US 6,327,628 B1
(45) Date of Patent: Dec. 4, 2001

(54) PORTAL SERVER THAT PROVIDES A CUSTOMIZABLE USER INTERFACE FOR ACCESS TO COMPUTER NETWORKS

(75) Inventors: Ed Anuff; John Dean Taylor; Miles Chaston, all of San Francisco; David MacLeod, Oakland; Peter Leiser, Berkeley; Oliver Muoto, Menlo Park; Seth Ladygo, San Francisco; Brian Slesinsky, San Francisco; Terry Joyce, San Francisco, all of CA (US)

(73) Assignee: Epicentric, Inc., San Francisco, CA (US)

( * ) Notice: Subject to any disclaimer, the term of this patent is extended or adjusted under 35 U.S.C. 154(b) by 0 days.

(21) Appl. No.: 09/573,226

(22) Filed: May 19, 2000

(51) Int. Cl.[7] .................................................. G06F 17/30
(52) U.S. Cl. .............................. 709/311; 709/213; 707/9; 707/501; 713/200
(58) Field of Search ..................... 709/310, 311, 709/328, 213, 217, 218, 219; 345/333, 335; 707/500, 501, 513, 10, 104, 9; 717/1; 713/200

(56) References Cited

U.S. PATENT DOCUMENTS

| | | | |
|---|---|---|---|
| 5,339,392 | * 8/1994 | Risberg et al. | 345/333 |
| 5,740,549 | * 4/1998 | Reilly et al. | 705/14 |
| 5,892,905 | * 4/1999 | Brandt et al. | 713/201 |
| 5,983,227 | 11/1999 | Nazem et al. | 707/10 |
| 5,991,768 | 11/1999 | Sun et al. | 707/104 |
| 5,995,756 | 11/1999 | Herrmann | 717/11 |
| 6,012,098 | 1/2000 | Bayeh et al. | 709/246 |
| 6,014,666 | * 1/2000 | Helland et al. | 707/9 |
| 6,023,721 | 2/2000 | Cummings | 709/201 |
| 6,026,433 | 2/2000 | D'Arlach et al. | 709/217 |
| 6,029,196 | 2/2000 | Lenz | 709/221 |
| 6,032,150 | 2/2000 | Nguyen | 707/102 |
| 6,061,696 | 5/2000 | Lee et al. | 707/513 |
| 6,067,477 | * 5/2000 | Wewalaarachchi et al. | 700/83 |
| 6,075,528 | 6/2000 | Curtis | 345/333 |
| 6,085,198 | * 7/2000 | Skinner et al. | 707/103 |
| 6,088,679 | * 7/2000 | Barkley | 705/8 |
| 6,131,116 | * 10/2000 | Riggins et al. | 709/219 |
| 6,144,990 | * 11/2000 | Brandt et al. | 709/203 |
| 6,163,880 | * 12/2000 | Ramalingam et al. | 717/1 |
| 6,202,066 | * 3/2001 | Barkley et al. | 707/9 |
| 6,209,124 | * 3/2001 | Vermeire et al. | 717/1 |

OTHER PUBLICATIONS

"*Corporate Portal Architecture*—Special Report on Infoimage Freedom", The Delphi Group, 100 City Hall Plaza, Boston, MA 02108–2106, Nov. 1999, pp. 1–20.

(List continued on next page.)

*Primary Examiner*—Dung C. Dinh
(74) *Attorney, Agent, or Firm*—Swidler Berlin Shereff Friedman, LLP

(57) ABSTRACT

A portal server presents an HTML page that comprises a plurality of modules that are formatted in a predetermined layout. Each module represents a network resource that can be accessed by a user through the portal. Some of the modules can be user-selectable, whereas others may be mandatory elements of the portal. Similarly, some aspects of the layout may be user-controllable, while others are fixed. The modular nature of the portal enables the various resources to be readily and independently updated by the entities who provide them, without affecting other features of the portal. The portal server includes an administration interface that enables an administrator to select from various layout styles, as well as control access to site information and services. A variety of customizations can be done to the portal without requiring programming skills. As a result, individual businesses and other entities can exercise complete ownership of their portals, from a hosting, branding and design perspective.

12 Claims, 10 Drawing Sheets

OTHER PUBLICATIONS

"*Looking Under the Hood: DataChannel Server's Intelligent eXtensible Architecture (IXA)*", DataChannel Server 4.0, 2000 DataChannel, Inc., 600 108$^{th}$ Avenue N.E., Suite 900, Bellevue, WA 98004, pp. 1–12.

"*Plumtree Corporate Portal Server Technical Architecture*", pp. 1–2.

"*Portal One*", Technical Overview, Verity, Inc., 2000, 6 pps.

"*Portals With a Purpose, Acclerating Design Quality & Velocity*", Kinetic Information, 106 Thornton Road, Waltham, MA 02453–7647, Jan. 2000, pp. 1–8.

"*TIB ®/PortalBuilder™, A TIPBCO ActivePortal™ Product*", TIPCO Software Inc. Worldwide Offices, 2 pps.

Foley, Mary Jo, "*Oracle pitches unified data viewing*", Sep. 22, 1999, 2 pps.

Rodriguez, John A. et al, "IBM Enterprise Information Portal—the bean story", IBM EDMSuite Newsletter, vol. 2, Issue 3, Fall 1999, pp. 1–7.

Rymer, John R., "*IONA Technologies & the Enterprise Portal Market*", IONA Technologies PLC, Nov. 1999, pp. 1–21.

* cited by examiner

PORTAL SERVER THAT PROVIDES A CUSTOMIZABLE USER INTERFACE FOR ACCESS TO COMPUTER NETWORKS

FIELD OF THE INVENTION

The present invention is generally directed to the mechanisms via which users access information provided over computer networks, such as the Internet, intranets and extranets. More particularly, the present invention relastes to a portal mechanism via which users gain access to resources at various network sites.

BACKGROUND OF THE INVENTION

Browser applications have become ubiquitous tools for accessing the vast amounts of information that are available via computer networks, such as the Internet and the like. At its basic level of operation, the browser permits a user to connect to a given network site, and download informational content from that site, such as an HTML document, for display at the user's computer. To view additional information, or a different type of information, the user designates a new network address, e.g. a different HTML file, whose contents then replace the previously displayed information on the user's computer.

To alleviate the need to navigate from one network site to another to view different types of informational content, portals are being employed on a more common basis. In general, a portal is an entry point or gateway for access to Internet web sites, or the like. One of the prominent advantages of a portal is the fact that information stored at a plurality of different network addresses, including different sites, can be simultaneously viewed on the display, rather than limiting the user to information from one site at a time. Most companies and organizations provide different types of portals for a variety of purposes, including portals for the general public, intranet portals for their employees, and extranet portals for their customers, vendors, supplies and other parties with whom they transact business.

While the organizational needs served by a portal continue to grow, so have the complexity and cost of developing, deploying, administering and continually enhancing portals. To maintain the continued interest of portal users, administrators must carry out an ongoing effort to maintain portal content that is fresh, deep, customizable and sufficiently broad that their constituents will consider them to be a meaningful gateway to the Internet. On its intranet, an employer must often compete with public portals for the attention of its employees. Furthermore, companies and organizations are forced to either maintain staffs of highly skilled engineers and content developers, or to outsource these tasks. Meanwhile, Internet-related technologies are proliferating and maturing, and Internet users' expectations continue to increase. Maintaining an effective portal often competes with and detracts from the resources available for an organization's primary goals.

SUMMARY OF THE INVENTION

To address the foregoing concerns associated with the ongoing maintenance of an effective portal, the present invention provides a portal server that streamlines the processes involved in offering a feature-rich portal. The portal server provides services through a library of object-oriented classes, such as classes in the Java programming language developed by Sun Microsystems, that give access to various databases, web servers, scripting environments and mail services.

At the user interface level, the portal server presents an initial view, or front page, that comprises a plurality of modules that are positioned in a predetermined layout. Each module represents a resource of a particular type that can be accessed by the user utilizing the portal. Some of the modules can be user-selectable, whereas others may be mandatory elements of the portal, as determined by an administrator, for example. Similarly, some aspects of the layout may be user-controllable, while others are fixed. The modular nature of the portal enables the various resources to be readily and independently updated by the entities who provide them, without affecting other features of the portal.

In another aspect of the invention, the portal server includes an administration interface that enables an administrator to select from various look-and-feel templates, as well as control access to site information and services. A variety of customizations can be done to the portal without requiring programming skills. At the same time, however, script writers can change pages, and programmers can extend functionality through additional classes.

As a result, individual businesses and other entities can exercise complete ownership of their portals, from a hosting, branding and design perspective. The features and advantages of the present invention that offer these capabilities are described in detail hereinafter with reference to the accompanying figures, which illustrate exemplary embodiments thereof.

BRIEF DESCRIPTION OF THE DRAWINGS

FIGS. 5a and 5b are diagrams illustrating two exemplary page layouts;

DETAILED DESCRIPTION

To facilitate an understanding of the present invention, it is described hereinafter with reference to specific implementations thereof. For example, the software programs that underlie the invention can be coded in different languages, for use with different platforms. In the description that follows, examples of the invention are described in the context of web sites that employ Java Server Pages (JSP) or Active Server Pages (ASP). It will be appreciated, however, that the principles that underlie the invention can be implemented with other types of computer software technologies as well.

1. Overview

Figure 1:
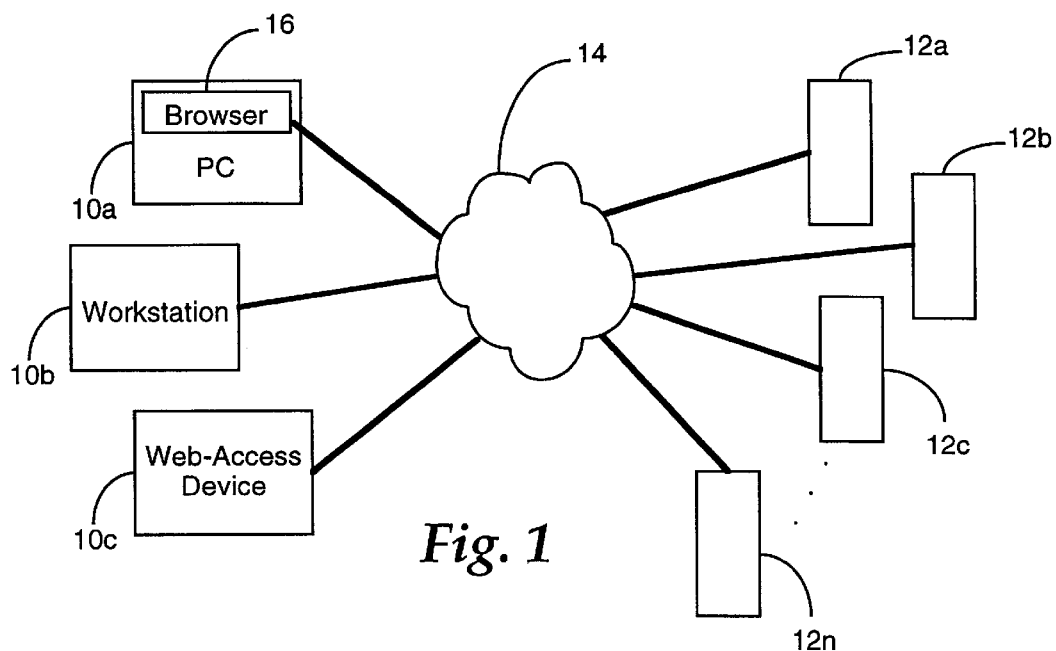
FIG. 1 is a general block diagram of an exemplary network system in which the present invention can be implemented.

A general depiction of a networked computer system in which the present invention can be implemented is illustrated in FIG. 1. In essence, the computer system enables individual users of communication devices 10, including personal computers 10a, workstations 10b, web access devices 10c, and the like, to view informational content provided by various servers 12a–12n. The communication devices 10 are connected to the servers 12 by means of a suitable communications network 14, such as a local area network, a wide area network, the Internet, or the like. To view the content provided by the servers, the devices 10 run a browser application 16. At the servers 12, the available content and services are stored on suitable storage media, such as magnetic or optical disk drives, in a format that is capable of being read by the browser applications, such as HTML or XML. Typically, each segment of information that can be accessed at once, e.g. file, is referred to as a web page, and has an associated network address. Thus, by entering a particular address in a browser application, the user is presented with one page of information that is stored at a particular server. A collection of web pages that relate to a common topic and are interlinked with one another may form a web site.

At its basic level of operation, a browser is designed to display one web page at a time. In such a case, the user is required to navigate from one web page to another in order to view different types of information available on different sites. Quite often, however, the user desires to be able to view a variety of different types of information at once, and then select the particular type of information that is of most interest at that time. For instance, within a corporate context, a user may desire to have quick access to various resources and data provided by the employer, while at the same time being able to view information provided over the Internet, such as news headlines, financial data, and vendor data. To this end, therefore, portals have become popular mechanisms that enable users to access information from multiple different network sites at once.

Figure 2:
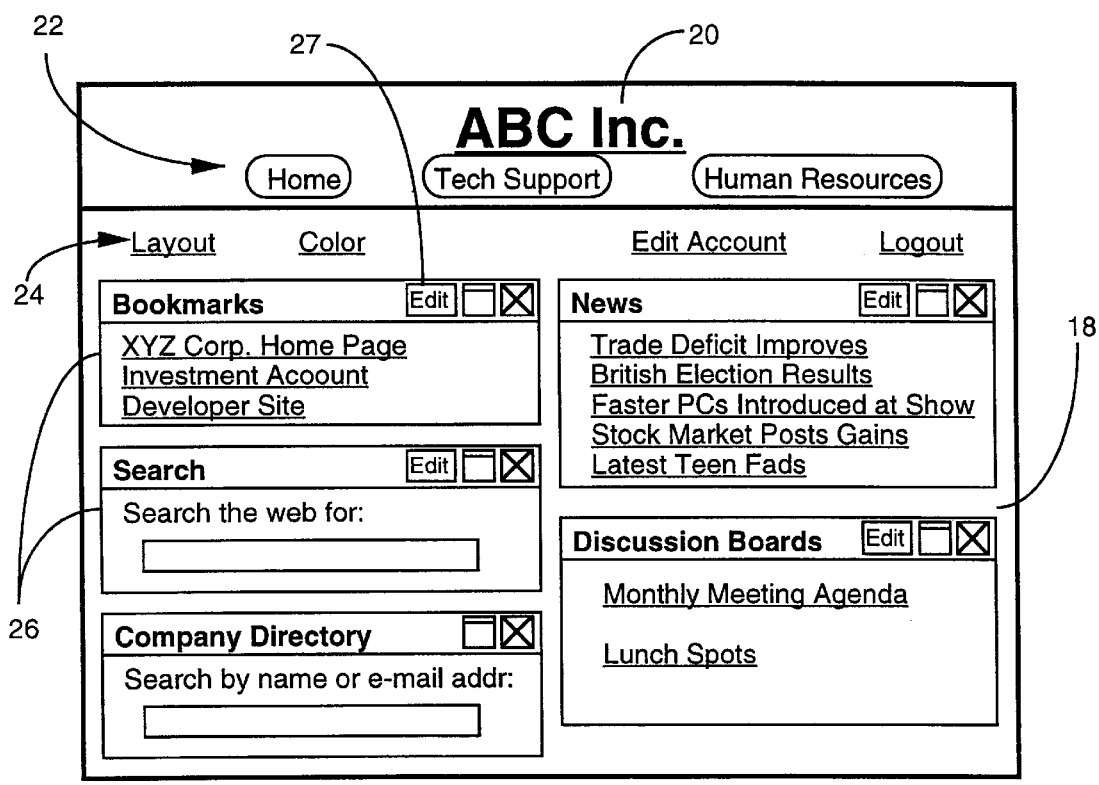
FIG. 2 is an illustration of an exemplary front page of a portal.

The present invention is particularly directed to a server application and framework that dynamically constructs and maintains portals for display to users. An example of a portal display that incorporates features of the present invention is illustrated in FIG. 2. The portal comprises an HTML web page 18, identified as a "front page". In essence, each page presents a predetermined layout of encapsulated modules containing the resources that are available to the user. The top of the page may include a suitable banner 20 containing a corporate logo or the like, and one or more navigation buttons 22 or links, that permit the user to access specific pages associated with the sponsor of the portal, e.g. the user's employer. Below the banner, another set of buttons or links 24 are displayed, which permit the user to personalize the portal. In the illustrated example, the personalization buttons enable the user to revise the layout of the portal, change its color scheme, and edit that user's account, e.g. change a password.

Below the banner 20 and the personalization buttons 24, one or more modules 26 are displayed. Each module provides the user with access to a particular type of resource, such as news headlines or stock quotes. As will be apparent from the discussion that follows, these resources can be applications, databases, services, informational content, e-commerce offerings, and the like, that are available from one or more of the servers 12a–12n. Some of these resources may be provided by the employer (or other provider of the portal), whereas others may come from independent third parties. By interacting with any one of these modules, the user can access the information or services provided by that module. Thus, by clicking on a headline in the "News" module, the user can be presented with the full text of the news story to which that headline pertains.

In the example of FIG. 2, the modules are arranged in two columns, or groups. Through the ability to personalize the layout of the portal, the user can determine which modules appear in each of the groups, as well as their order of appearance within the groups. In addition, the user can edit the content of individual modules, by means of an "Edit" button 27. For the "News" module, for instance, the user can select which news sources are to be used for the selection of headlines, as explained in greater detail hereinafter.

2. High-Level Architecture

Figure 3:
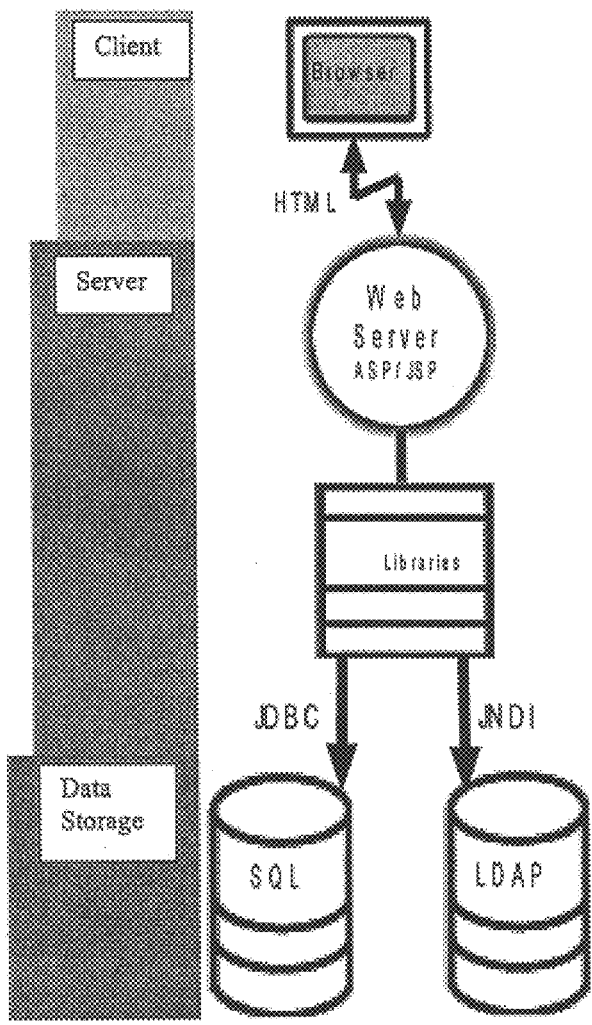
FIG. 3 is a diagram of the high-level architecture of the portal server.

The functionality associated with the portal is provided by a portal server, running on one or more of the servers 12a–12n. Referring to FIG. 3, the portal server can be viewed as a client/server model. The client interface is provided by HTML code generated by the portal server to run in a user's browser application. The server consists of process management services that are provided by a web server and suitable class libraries. These libraries connect to other servers and use other resources as needed, including a data store which provides object persistence via a suitable database interface. In one exemplary embodiment of the invention, this functionality might be provided by a JDBC interface over a SQL database. In another embodiment based upon an LDAP environment, user management can be provided via JNDI over LDAP. The server can connect to other network resources, for example to acquire information from the Internet or an intranet.

Prior to any customization by an administrator, the portal server can provide a set of web pages that constitute a default, self-contained portal web site. One implementation of the portal server includes a Java Server Pages (JSP) web site, for use under any web server that supports Java servlets and JSP. Another implementation comprises an Active Server Pages (ASP) web site, for use under Internet Information Server (IIS) provided by Microsoft Corporation. Both of the implementations under these different scripting environments can use the same Java libraries and services; the primary difference between them is the web site upon which they are based (JSP or ASP), and how the web site interfaces with the Java libraries.

3. Object Model

An object-oriented software system consists of software objects. A software object represents an actor within an overall system design. Such actors may correspond to real-world concepts, or may exist purely to support the overall design. Software objects encapsulate the data and logical processes of the actor. This encapsulation makes objects easy to use, because the user of an object need not know how the object performs its processes. Software objects are also extensible: other objects can be built on top of existing objects, allowing the new object to expand the concept of the old object without having to rewrite the functionality. These properties of software objects make object-oriented systems flexible and extensible.

An object model comprises a collection of objects that work together in documented relationships. The portal server is an object-oriented system built on such an object model, illustrated in FIGS. 4, 6 and 7. The objects that make up the portal server architecture include Components, Managers and Services, Modules, Views, Pages and Page Ordering, Layouts, Users, Permissions, Content Parsers, Data Storage and Tasks.

3.1 Components

Components are a set of loosely related classes used to create wrappers to provide simplified access to other objects within the architecture of the portal server. In a preferred embodiment of the invention, one component 28, designated as the "Portal Services Component," is employed as a single point of access for methods that are external to the portal server. The function served by the Portal Services Component is access to other objects within the architecture. Since the Portal Services Component provides a single point of access, it allows a very simple distributed object registry profile for use in object brokers. Only the Portal Services Component need be registered. Other objects can be accessed by calls to the Portal Services Component. An example of an object broker is the Microsoft Common Object Model (COM). When running under an ASP web site, for example, the Portal Services Component can be published as a Microsoft COM/ActiveX control. An instance of this class is created once at web server startup in an ASP environment.

In contrast to the ASP environment, under a JSP web site, any JSP page has access to any Java object made visible in the classpath. However, the Portal Services Component can still be used as a single point of retrieval for important objects within the architecture. This architecture provides simplicity as well as compatibility with the ASP version of the portal server.

3.2 Managers and Services

Managers and Services perform similar functions, but in slightly different and complementary ways. A Manager encapsulates details for handling the creation and manipulation of a set of objects. A Service can encapsulate any identifiable Application Programming Interface (API) within the portal server. Managers can be implemented as Services within the portal server; however, Services are not restricted to being Manager implementations. Both Managers and Services allow for run-time replacement of their implementation with specific versions adapted to user-specific needs.

Two examples of Managers are a module manager and a user manager. Modules follow a "singleton" design pattern, meaning that there is one instance of a module for the lifetime of a server session. The class of module managers, therefore, maintains those module instances, and handles their persistence. The user manager class is an abstract class whose purpose is to manage the persistence of User objects. Classes that extend this class could, for instance, store users in a SQL database or an LDAP server or Java serialization.

To be useful to a broad range of portal providers, a portal framework must easily allow different implementations of key services. Services such as user management, flexible schema storage, and search engines are likely to be different for different portals. To facilitate a high degree of customization, the portal server includes technology for allowing configuration-data driven resolution of service implementations within the portal server. This technology provides a means of allowing runtime resolution of the specific class used to implement the service, as well as configuration of all its properties.

Essentially, a Service allows a few lines of configuration data within the computer system's startup configuration files or registry to specify details of the run-time implementation, including the actual class to be run to provide the service. This allows the portal provider to use existing implementations or define their own, and substitute their chosen implementation into the system without rewriting source code that uses the implementation.

The portal server Service includes the following elements:
1. a format for specifying configuration directives identifying the service implementation, by type and by name;
2. a format for specifying and locating configuration directives used by the service implementation;
3. A Service Manager class, which acts as the factory for loading and retrieving individual Service Managers;
4. A Service Manager API, which an implementation must satisfy to act as service manager to a particular service type; and
5. a "Service" API, which an implementation must satisfy to act as a Service.

Given these elements, a process can utilize a Service by calling the Service Manager class, and asking for a particular service manager by its type. Once the service manager is retrieved, it can be used to retrieve a particular service, by giving the name of the service. Once the service is retrieved, it can be used for its intended purpose.

3.3 Modules

Figure 4:
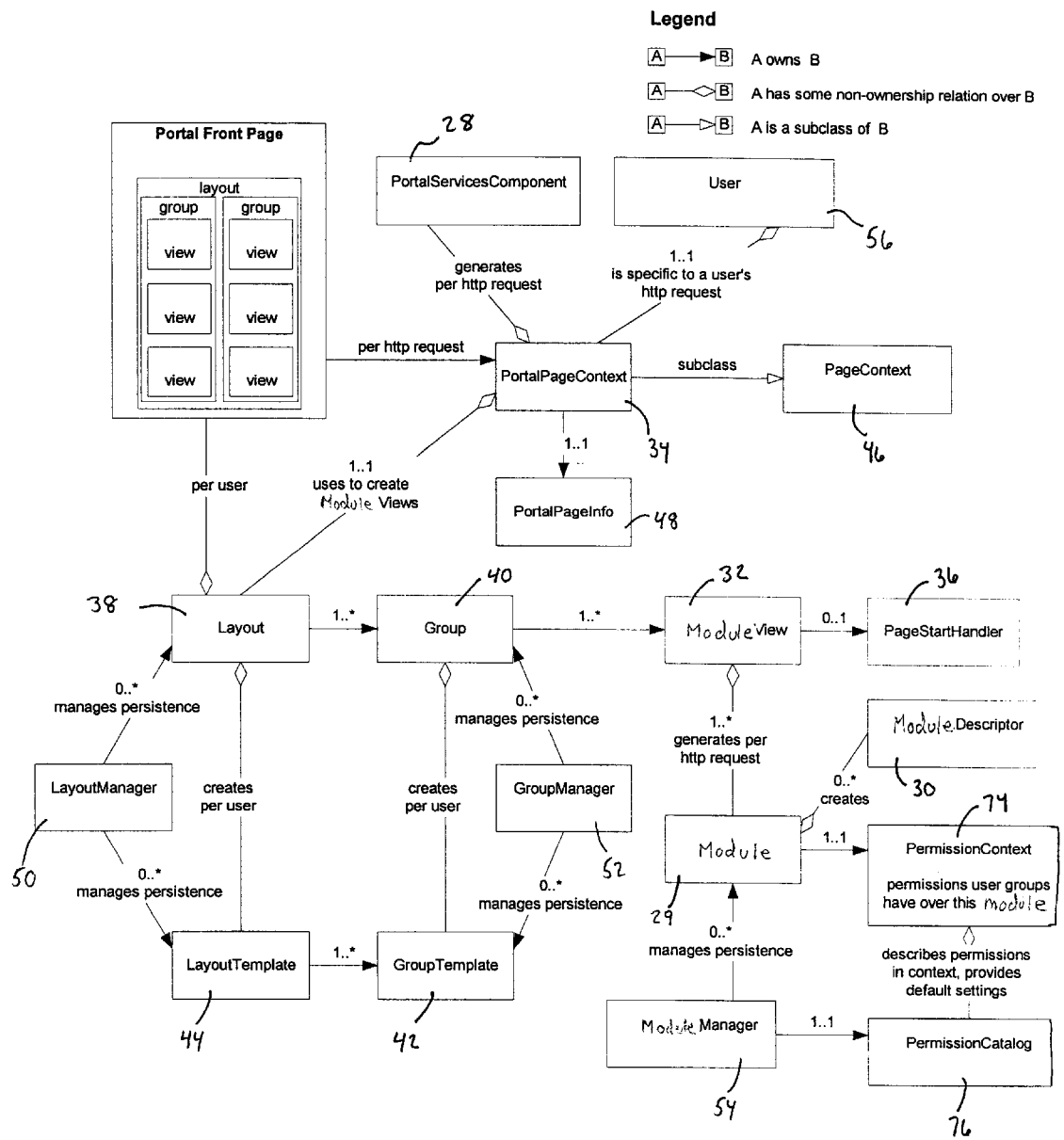
FIG. 4 is a block diagram of an object model for a module.

Modules are objects that encapsulate a specific, bounded portion of content at a network address, and allow that portion to be administered as a unit. For example, a module might display news, sports scores, stock quotes, or weather forecasts. Site and end-user content preferences are expressed by the set of modules displayed on a portal page. FIG. 4 illustrates the module object model. A module 29 follows the "singleton" design pattern, the same as Java servlets, which means that the portal server keeps only one instance of the module, which persists for the lifetime of a web server session.

3.3.1 Module Types and Descriptors

Each new class that implements the module interface defines a new module type. Each module type has a module descriptor object 30, that defines metadata for the module, such as its name, administrative properties, and default settings. A module descriptor gets its initial data from an XML document. The metadata for a module can be customized simply by editing the XML document. Since XML documents are quite easy to change, the module descriptor provides another point for the customization of the portal server. Each module descriptor represents a module type that can be added to a portal using an administration GUI (described hereinafter). A module that has been added to a portal is an instance of its module type.

3.3.2 Views

Views are the means by which the portal server isolates the presentation logic so that it can be more easily customized. The Module View 32 is the display logic for a particular view, or mode, of a particular module. Examples of views are the front page of a portal, where the module is displayed within a box or other graphical region (as shown in FIG. 2); the page where a user customizes a module (for example, selects news categories or stocks of interest); and the page where the portal administrator customizes the global properties of a module. A new view object is created for each HTTP request.

The Module View interface defines constants identifying these and other common views. Modules can also create custom views to handle module-specific processes. Implicit to most methods in this interface is that the Module View contains an HTTP request, an HTTP response, and other page-specific data, all of which is encapsulated within a Portal Page Context object 34. However, this interface specifies no method for setting that information. This architecture provides flexibility for the creating module to independently manage and create its views. Any object can perform some process at the start of a Module View by implementing a Page Start Handler object 36, and passing itself to the view via its constructor.

Each module view's purpose is to create an HTML page, or part of an HTML page, displaying some aspect of the module's data. Module views can generate their HTML through any means desired. To this end, therefore, certain types of modules can be defined for the portal administrator to use as building blocks in the construction of a portal site. For example, a "clip" module can capture specific HTML elements from an HTML page, so that only those elements are retrieved as the content of a module. In contrast, an "include" module can be defined that is capable of capturing the entirety of an HTML page for inclusion in a module. In these types of modules, the HTML data can be embedded in the Module View class. Other types of exemplary building block modules comprise an XML inclusion module, which retrieves an XML style sheet and generates the HTML for display as the content of a module; a transaction module which can employ a script to obtain filtered data from a network location for display in a module; a JSP module, which can execute a JSP page and display the contents of that page as the contents of the module; and a module that creates a framework for multiple JSP pages providing common module views.

Using JSP with modules has a number of advantages:
1—Modules that use JSP are easier to maintain than modules that embed their HTML in a Java class. If a module's JSP file is changed, all users of that module see the changes immediately, with no recompiling of Java class files required.
2—Once a module is built using JSP, HTML knowledge is all that is required to change the module's look-and-feel.
3—Because the HTML generation is controlled by JSP, the Module View objects can be very thin.

A module subclass can be defined that enables creation of new module types using only JSP. Modules that do not need their own new methods can use this subclass and JSP files for all of their functionality. Each module view corresponds to a JSP file that contains the HTML and logic for that view. The portal server allows a Module View, which is a class object, to execute a JSP page and add its results to the overall HTML page being constructed.

3.3.4 Portal Page Context and Portal Page Info

A Portal Page Context object 34 extends the Page Context class 46, which can be a class within the javax.servlet.jsp package provided by Sun Microsystems. The Portal Page Context object contains everything a Module View needs to know about its execution environment. A Portal Page Info object 48 tells the modules about the display characteristics of an HTML page that is being constructed. By using the Portal Page Info object passed to them via their page context, all modules on a page can coordinate their fonts, colors, and other display characteristics.

3.4 Page Layout

Multiple modules are presented to the user, for example, within an HTML pages. The present invention enables the addition of modules to a page to take place in a flexible manner, which provides control to both a portal administrator and the end user. Several alternative methods for achieving such a result can be used.

3.4.1 Layouts and Groups

A Layout 38 contains the Groups 40 on a specific HTML page of the portal, and Groups contain a set of modules specific to one user of the portal. Hence, in the example of FIG. 2, the Layout for the illustrated page contains two groups, e.g. left column and right column, and the two groups contain three and two modules, respectively. A module constructs a Module View that is specific to the user and context, and the view assembles the HTML presentation. The JSP or ASP code enumerates through groups and then enumerates through the modules within each group.

A Group Template 42 is a pattern used by a Group object to create itself. Unlike a regular Group object, the Group Template is not user-specific.

A Layout Template 44 holds a collection of Group Template objects. A regular Layout is created by patterning itself from a Layout Template.

3.4.2 Pages, Page Layout and Page Ordering

An alternative to Layouts and Groups can use Pages, Page Ordering, and Page Layouts. This alternative can provide better built-in support for multiple-page designs, such as those typical of a "tabbed" user interface. In a tabbed user interface, the end user mouse-clicks on one of a series of tabs to move between pages. Each page has its own content and layout.

The site administrator can create pages, and can publish them for availability by end users. The general steps for an administrator to create a page and make it available to users are as follows:
1. Create the page by identifying its descriptive information: e.g. title and description;
2. Establish the page layout, as a set of columns and/or rows in which modules are to be grouped. Columns and rows form cells. Characteristics of cells, such as relative or absolute widths, are set as part of this step. The administrator can be shown a grid that visually reflects the layout of cells within the page. FIGS. 5a and 5b illustrate two examples of such a grid. The layout of FIG. 5a is row-centric, i.e. it comprises two horizontal rows of module cells, whereas the layout of FIG. 5b is column-centric;
3. Specify modules for cells within the page. The administrator can leave the set of modules completely up to the end user, or can add modules to cells within the page. The administrator can decide whether a given module is optional to the end user, or is required. The administrator can also lock entire cells, effectively dictating a predefined set of module content;
4. Assign styles to elements of the page;
5. Assign appearance settings, such as fonts and color;
6. Publish the page, making it available to one or more user groups, and establishing the order of this page relative to others.

Once a page has been published, it can become available to end users. They can control which modules are on the page, within the restrictions established by the administrator. For example, users might be able to choose modules and rearrange them within the cells of one page, but the portal administrator might lock the content and arrangement of another page.

Page ordering is controlled by a Page Ordering object within the object model. This object holds the collection of published pages, and supports re-ordering of the pages. This is a portion of the API that can be used, for instance, to affect the relative tab positions of published pages. In an implementation of the administration user interface, it can use the API to allow the portal administrator to re-order pages visually.

3.4.3 Manager Classes

The Layout Manager class 50, the Group Manager class 52, and the Module Manager class 54 manage object persistence. For each defined layout, the Layout Manager maintains information regarding the groups contained in that layout. The Group Manager, in turn, maintains information describing the modules that comprise each group. The module Manager determines the particular characteristics of each module in a group, e.g. which news sources the user has selected for display in a "News" module.

3.4.4 Templates and Styles

Templates and Styles collectively provide a Templates API. In one implementation, there are three main classes in the Templates API: the Style class, the Template Manager class and the Template class.

The Style class corresponds to a single style. The Style class contains methods to display itself (the execute methods) and to make itself persistent. The Template Manager class is used to create, retrieve and store Template objects. The Template class corresponds to a single style type. The main function of this class is to associate default Styles with particular templates and to create Style objects. Default Style associations for every template can be made on a system-wide, peruser-group, per-page, or per-user-group-per-page basis.

3.5 Users

Figure 6:
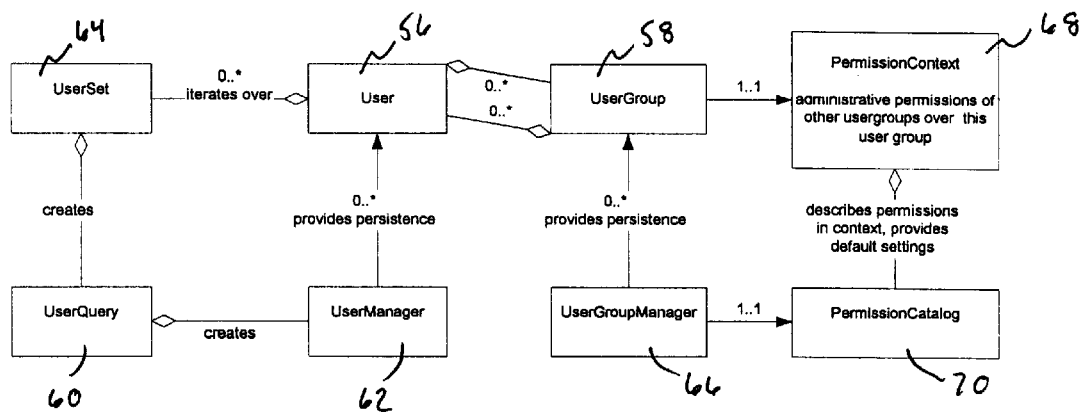
FIG. 6 is a block diagram of a user object model.

A User object 56 represents an end user of the portal. FIG. 6 illustrates the User object model. Referring thereto, a User Group 58 is a site-defined group of users, to support permissions, described below. Registered portal users can be assigned to one or more user groups. Examples of user groups are Engineering and Sales, or Beginning and Advanced. The user data and group assignments can be stored in an LDAP directory or a database. User groups enable different portals to be targeted to different users, as well as to distribute different administrative functions to selected users. User Query 60 is an interface for searching and retrieving users. An instance of the User Query class is created via the User Manager 62, which is the abstract implementation of a class to manage User persistence. Classes that extend the User Manager class could, for instance, store user data via a SQL database, an LDAP server, or Java serialization.

A User Set 64 contains a set of User objects, and could be implemented in a relational database, for example. The User Group Manager 66 is an interface to the underlying representation of user groups.

The portal server manages user retrieval and authentication through a general API composed of the User Manager, User, and User Set classes. A portal server configuration property specifies the actual classes that are used at runtime. This design makes it possible to plug in any desired user manager implementation.

The portal server can employ various user manager implementations. Examples include one that is SQL-based and another that is directory server-based (JNDI over LDAP). A variation of the SQL user manager performs its user authentication against NT domain user accounts.

3.6 Permissions

Properties are associated with modules to determine which modules users can access, which ones they can customize, which ones they cannot remove from their front pages, and which ones they can minimize on their front pages. For instance, in the example of FIG. 2, the "Company Directory" module does not include an edit button 27, so that the user is not able to edit its content. In one implementation of the invention, a permissions architecture can be employed to control what a user group can do to a particular object. In this implementation, permissions can be associated with the Modules and Users classes. User group permissions determine whether one group can perform any administrative tasks over another group (for example, view the group membership, add members to the group, delete members from it, etc.).

Module permissions determine what a user group can do to a particular module. A standard set of permissions can apply to every module. Some of these can be end-user permissions (for example, whether a module is available to the members of the user group, whether the user group members can customize the module, etc.), while others are administrative permissions (for example, whether user group members can add new instances of a module or edit a module's end-user permissions). In addition, a module can have custom permissions that control access to functionality that is particular to that module. For example, a discussion board module might have custom permissions controlling whether a group is allowed to post messages to the board and create new discussion categories.

The various types of permissions can be set via an administration tool, which is preferably web-based. In addition, delegated administration modules, such as User Manager 62 and Module Manager 54, can enable user groups to perform specific administrative tasks without having access to the full range of administrative privileges available through the administration tool.

Figure 7:
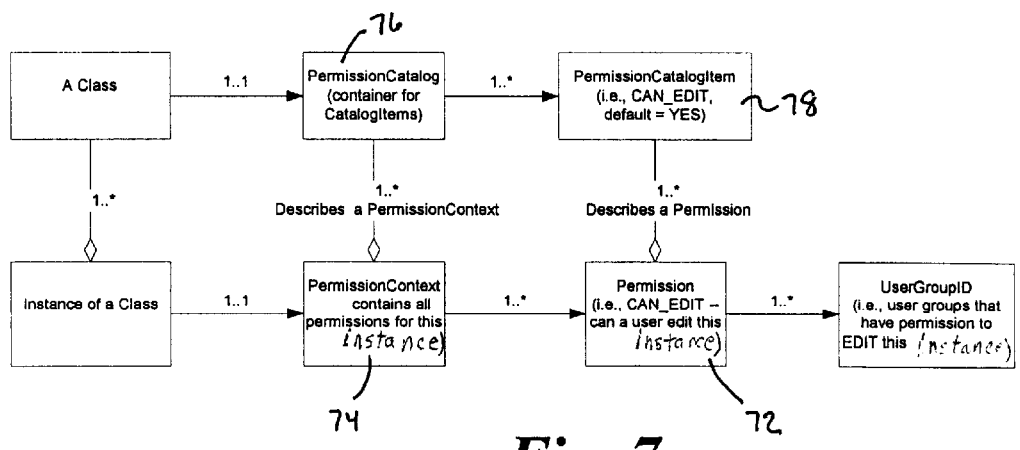
FIG. 7 is a block diagram of the permission object model.

FIG. 7 illustrates the permission object model. The core of the permissions API comprises four interfaces. A Permission object 72 is a string ID (such as "enabled"), a list of groups that are allowed the permission, and an "everyone" Boolean that determines whether the permission is on or off for everyone. This Boolean supercedes the group list. A Permission Context object 74 is a set of permissions. Each object that has permissions defined on it, like a module, has one Permission Context object containing all of the permissions for that object. Permission Catalog 76 is a static, class-wide list describing the permissions allowed in a Permission Context object. A catalog is used to initialize and update the permissions in an object's Permission Context. A Permission Catalog Item 78 is the definition of a permission within the Permission Catalog. Each item describes a permission's ID (e.g., CAN_EDIT), friendly name (e.g., "Can edit module"), and a default seed value for the "everyone" Boolean.

Each module has one Permission Context object 74 containing all the permissions defined for the module. There is one Permission Catalog that defines the standard module permissions. Each module defines a custom Permission Catalog. The catalog can be empty by default, but permissions can be added to the catalog by defining them within the module's descriptor file. All permissions referenced in the catalog are created when the module is instantiated.

3.7 Content Parsers

One of the significant advantages of the portal framework of the present invention is the fact that the resources that are made available to the user via the modules can come from a variety of third-party sources. Consequently, however, the content for the modules may be largely unstructured, which can be problematic when it is to be made available for manipulation and display within the portal. To this end, therefore, a parsing technology is employed for retrieving data from external web sites and various other sources, translating the data into XML, and returning structured results as objects for use by other entities, such as modules. A Content Parsing object is used for executing a transaction script and obtaining the results produced by it. The Content Parsing Manager class, which manages Content Parsing objects, can be instantiated by a web server or called directly using code.

Once the Content Parsing Manager is created and the script package loaded, transactions are created. Only one script package need be used per Content Parsing Manager. Since initializing a Content Parsing Manager can often involve time-consuming one-time setup operations such as loading and parsing a package file, preferably a single instance is created for each web server "application," while multiple Content Parsing objects are created to handle individual user actions.

The Content Parsing script provides a level of abstraction between a source of data, e.g. headlines from a news source, and the manner in which the data is used. If a change occurs in the data source, only the script needs to be updated, and not the various entities that use the data, such as modules, Java programs, JSP files, etc.

3.8 Data Storage

A portal is supported by an extensible database schema at the data storage tier of the overall architecture so that new data storage requirements do not in turn require a database administrator to modify the structure of underlying tables. The Data Storage object is a dynamically extensible, hierarchical data store, consisting of folders and documents, that enables modules to be developed that can store their own custom persistent properties, without having an impact on the overall schema.

The Data Storage object can also be employed to solve another problem, namely the performance hit associated with retrieving web content. The Data Storage object provides an infrastructure that can be used to cache web content. Recently used data can be stored in a memory cache, and content can be programmatically expired and/or uncached. The memory cache holds onto data with weak references, i.e. when memory gets scarce, garbage collection can be performed on the cache. The following API provides an interface to an abstract storage system:

1—Data Storage: the data store itself
2—Data Storage Folder: a folder within the Data Storage object. Folders can have an unlimited number of string or integer properties and can contain Data Storage Documents as well as subfolders. A folder within the Data Storage object is accessed by its path, similar to the operation of a file system.
3—Data Storage Document: a document within the Data Storage object. The document can be a string, a serializable object, a DOM Document, the contents of a URL, or a byte array. Each document can have an unlimited number of string properties.

Different implementations of the Data Storage class, with different persistence mechanisms, are possible. One version could use a relational database, another could use LDAP, and yet another could use custom machinery. In a SQL and file system implementation of the Data Storage class, document contents are stored in the file system. For instance, a document containing a Java object is serialized and written to a file. A document containing text has the text written as a simple bytestream to file. A document containing a URL has the contents of the URL downloaded and written as a bytestream to file. A relational database keeps track of document names and where in the file system their contents are stored. Every document, when created or retrieved, is automatically put into a memory cache. The memory cache can be cleared by the Java Virtual Machine (JVM) when resources are running low.

The portal server can be scaled by load balancing across multiple machines. Many web sites cannot be replicated across servers because of state cached in memory that gets out of synchronization. The portal server of the present invention can notify all servers in a cluster that cached content has changed.

3.9 Task

Services frequently need to be able to execute jobs according to a schedule. An example is a cache cleanup routine, which must be run, transparent to any user, on a regular basis, e.g. every 15 minutes. Another example is a news headline purge routine that should run every few days to remove headlines older than a specified number of days. In the portal server, these scheduled matters are handled by a task. A task is a collection of one or more subtasks coupled with a schedule. Tasks can be set up to run as external programs, Java programs in separate JVMs, on separate threads in the current JVM, or on the current thread.

A schedule defines run times. It is made up of an interval, interval units, and constraining variables:

1—Maximum number of repetitions (if left at 0, unrestricted);
2—Start date (if left blank, can start immediately, depending on other constraints);
3—End date (if blank, never expires);
4—Arrays of allowed days of week, days of month, and months (specifying any of these constrains the schedule to run only on days that match the array contents; the effect of constraining arrays is cumulative).

The Persistent Scheduler class executes from a collection of persistent tasks described in its database. It reads the database for all current tasks, finds those due to be executed, and executes them.

A Task Scheduler object can iterate over scheduled tasks until there are no more to schedule, or until a shutdown time. Direct Task is an interface for a task that can be executed directly, instead of by indirection. This interface is useful for single tasks that do not need input parameters.

4. Initialization Architecture

The portal server can have different initialization strategies, e.g. one for an Active Server Pages (ASP) version and another for a Java Server Pages (JSP) version. These strategies solve the problem of allowing dynamic web pages to obtain access to Java objects within the object model.

4.1 ASP Version

The ASP version of the portal server can run under Microsoft Internet Information Server (IIS). The bridge between IIS and Java classes is the Microsoft Component Object Model (COM), an operating system service for connecting objects that are written in different languages. The portal server registers one of the classes within its class library as a COM object, e.g. PortalServices. When a browser first accesses the IIS portal server ASP pages, an instance of PortalServices is created within the JVM. This PortalServices object provides a path to other portal server objects so that they do not also have to be registered with COM.

Figure 8:
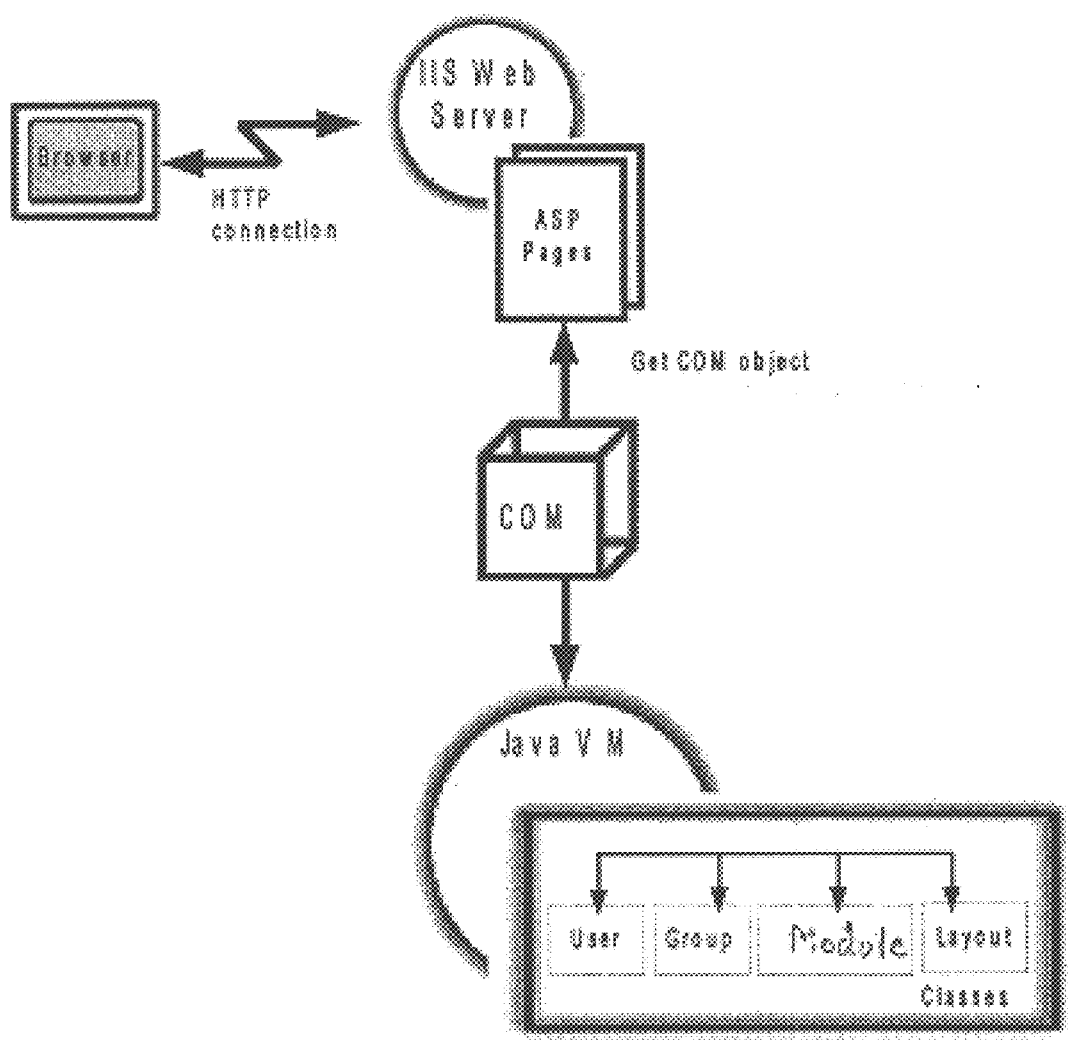
FIG. 8 is an overview of one implementation of the portal server.

FIG. 8 summarizes how the portal server works under ASP. IIS serves HTML and ASP pages for an IIS web application. According to the IIS definition, an "application" is the collection of files in a particular web directory and its subdirectories. Each application must have an initialization file, named global.asa, in its root directory.

Figure 9:
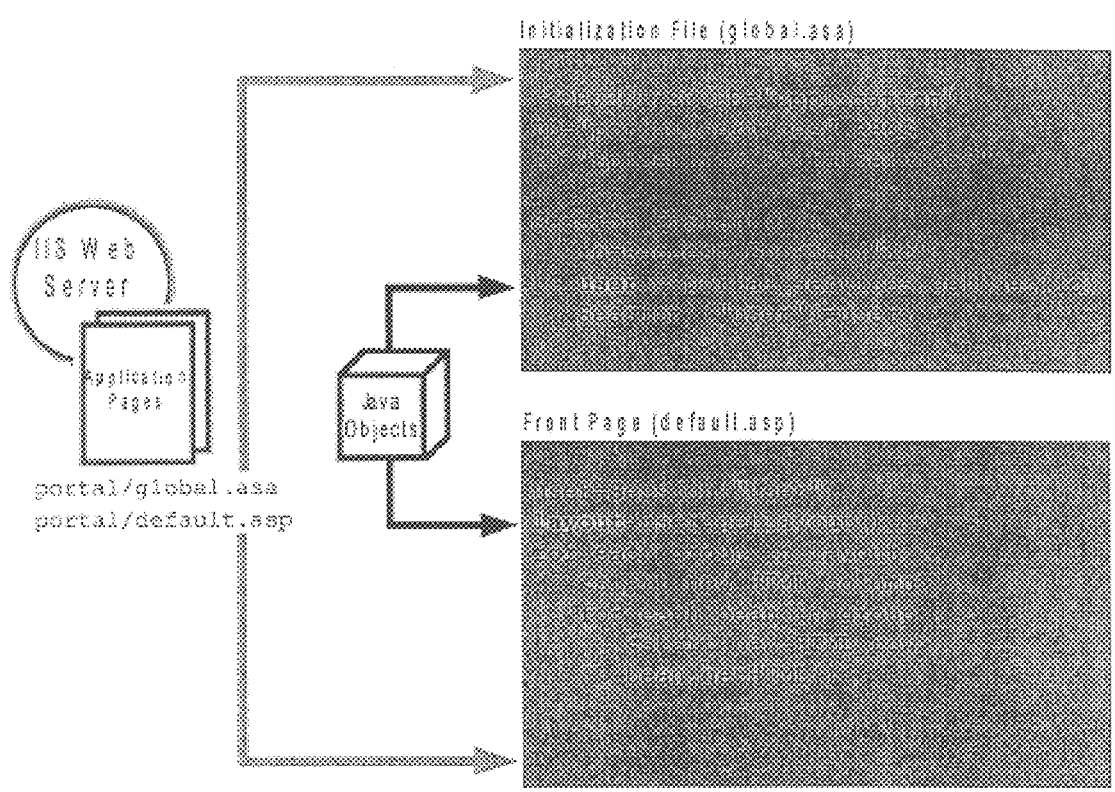
FIG. 9 illustrates the initialization and front page files for one implementation.

The starting point for an IIS application is default.asp. FIG. 9 shows the role of global.asa and default.asp in one possible portal server IIS implementation. Everything under the portal directory is part of the portal server application. The global.asa file in this directory is portal server's application initialization file. An OBJECT tag in global.asa creates one instance of the PortalServices COM component at web server startup.

At the start of a user's session, the global.asa file finds the correct User object, and the default.asp file creates the Layout object. ASP is used for the pages served to the user. JSP can be used to generate the module HTML within those pages, using the portal server's JSP execution environment. This technique constitutes JSP wrappering within an ASP environment

4.2 JSP Version

Unlike some scripting environments, standard JSP does not have the built-in capability to know when the web server has started, or to know when a new user has begun a session. By contrast, ASP has the notion of the global.asa file, in which code can be placed that is executed before any page in the directory is accessed by a particular user. Accordingly, the JSP version of a portal web site can be designed to ensure that initialization code is executed before any page of the site is run. The initialization code can be in a file that contains a session start method and an applications tart method. This file is preferably included at the top of every JSP file to ensure that the application and cur rent user have been initialized correctly.

5. User Session Control

A portal server session begins when a user first accesses any portal server page, and ends after a period of inactivity that is configurable via the web server, e.g. 20 minutes.

Identifying information about registered site users is stored in a database. A registration page enables new users to be added to the database; a login page enables users to identify themselves to the portal server by entering their user name and password. The login information can be stored as a browser cookie so that users don't have to log in each time they visit a site.

When a user accesses the portal site, the portal server checks for a cookie identifying the user. Site access can be controlled through a combination of cookies and two administrative flags: one indicating whether guest access is allowed and the other indicating whether new users can register themselves. If no cookie is found, the portal server can send one to the browser when a registered user logs in.

If a user is identified as a registered user, the portal front page creates a User object as well as a Layout object, which it uses to build the User's custom front page. For a guest user, a guest user account can be used. A guest user can access only the guest front page, the login page, and (if self-registration is allowed) the registration page.

Each portal server web page checks for the User object cached in the session; if none exists, the login page is displayed instead. This check prevents unauthorized access to any portal server page.

A site can change this behavior through portal server scripting pages—for example, to send unregistered users to some other site.

6. Module Display Within a Portal Page

Figure 10:
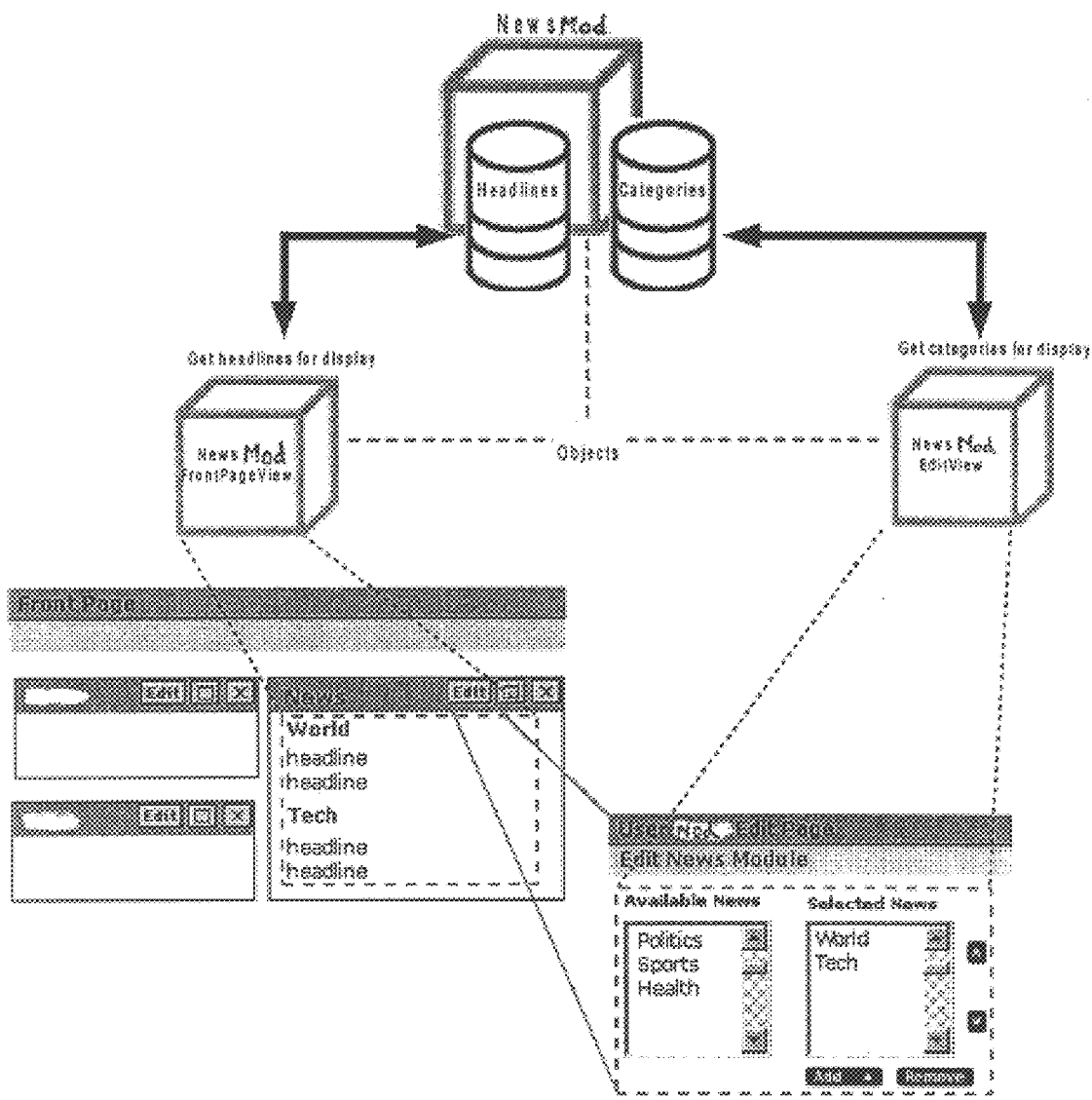
FIG. 10 illustrates front-page and edit views of a module.

Once a user has been registered, that user's front page is displayed via the browser application, for example as depicted in FIG. 2. Each module generates HTML, which the front page displays at that module's spot, as designated by the layout. A module displays various sets of information. For example, a news module displays various categories of news. On the front page, the news module displays news headlines. When the user clicks the module's edit button 27, the module displays the list of available news categories as well as the categories a user has already selected. A module provides these display capabilities by having a separate "view" object in charge of each type of display. FIG. 10 displays the front-page and edit views for the news module.

These two views create only the portion of a module that is surrounded by a dotted line in FIG. 10, namely its substantive content. The front page and user edit page create the rest of the displayed features.

Figure 11:
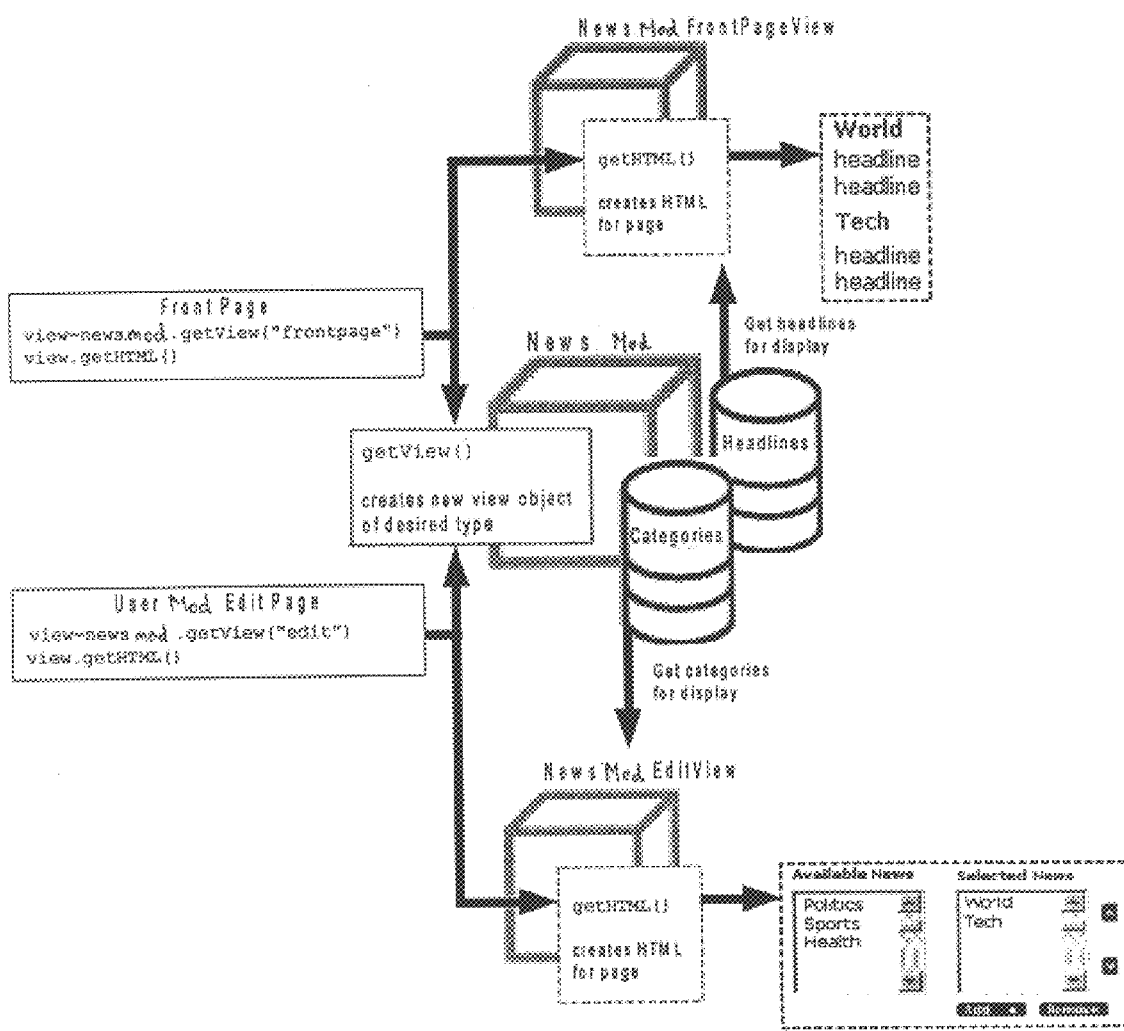
FIG. 11 illustrates the front page and edit views in greater detail.

A module view object contains the display logic for its module. When a user accesses the portal, each module on the front page creates an object that generates the HTML for its front-page view. When the user clicks the edit button of a module, the edit view object creates and displays the user edit page. FIG. 11 shows the display logic in more detail, again using the news module as an example.

A layout page, which is accessed by one of the personalization links 24, lists all modules that are available to any user group to which the user belongs. Users can add, remove or reorder the modules that are included in their layouts by means of this page.

Figure 12:
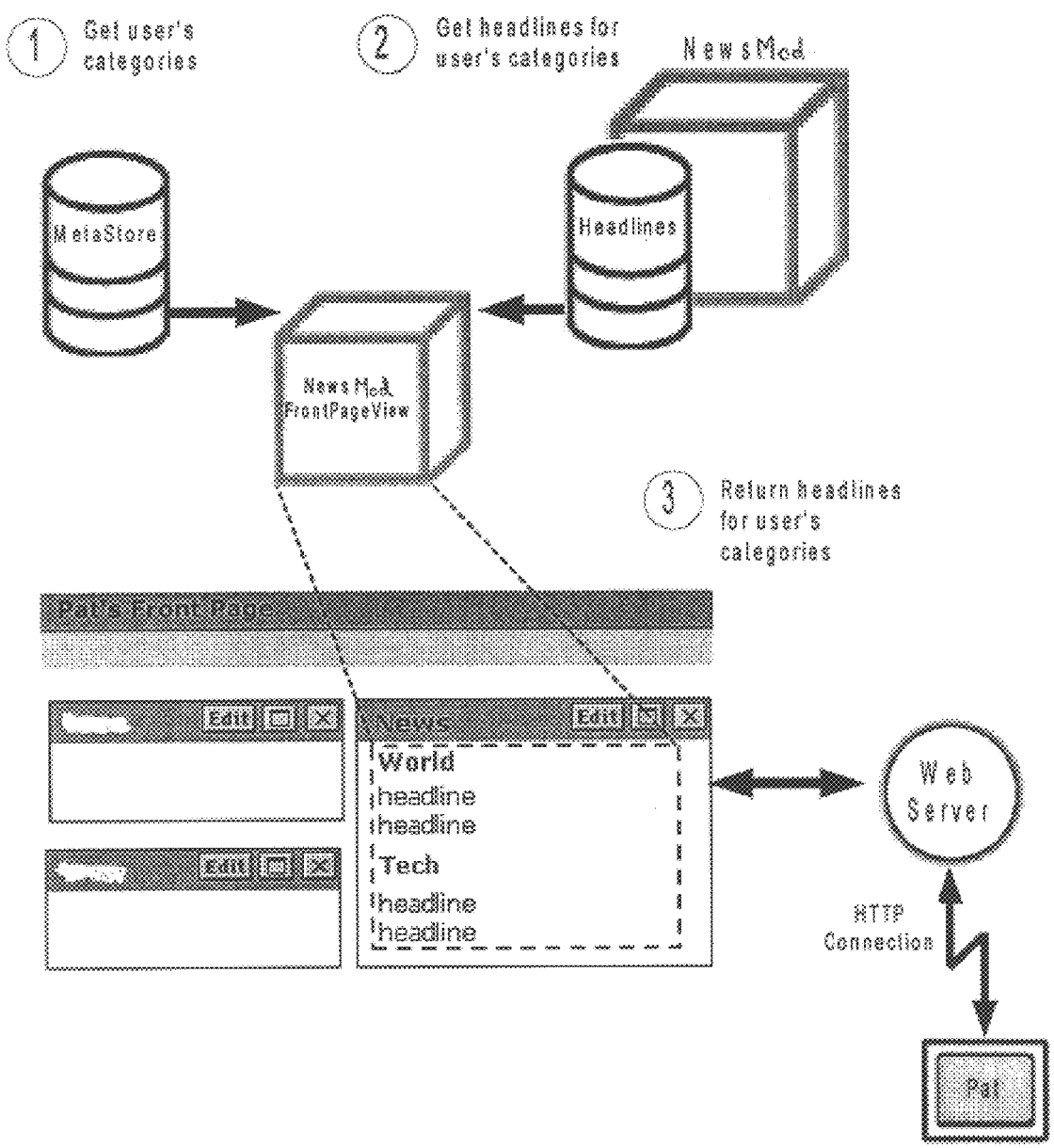
FIG. 12 illustrates a customized front-page view.

Modules allow attributes to be added easily, without concern over the method of storage. The portal server provides custom properties, which support an easily extensible storage mechanism. FIG. 12 illustrates how the hypothetical news module could use the Data Storage object to customize a view for a particular user. The Data Storage object stores any administrative customizations that a module might have. In the case of the news module, these customizations could be default news categories that individual users can override for their own front pages, categories that users are required to include on their own front pages, or a combination of the two.

A module can have custom properties as well. A module might use a custom property for values an administrator would change frequently—such as reminders or a "tip of the week."

6.1 Multithreaded Module Preparation

Since the portal server partitions a web page into logical components, i.e. modules, they can do much of their work separate, simultaneous threads. Multithreading permits multithreaded page requests to yield faster page response time, especially for heavily dynamic and network-bound pages. For example, if three modules are making network connections to get their data and each one takes two seconds, the response time for a single-threaded application would be at least six seconds. However, a multithreaded portal server's response time could be closer to two seconds.

7. JSP Hosting

Figure 13:
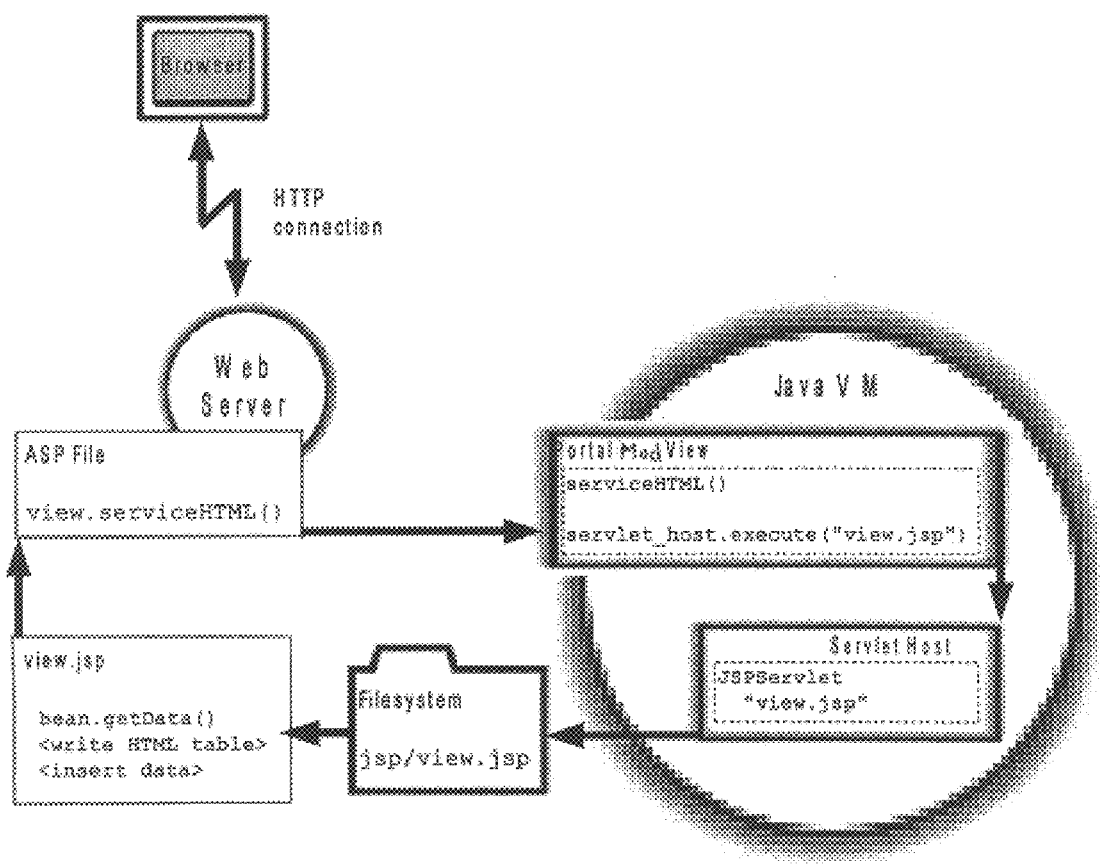
FIG. 13 depicts the execution environment for one implementation of the portal server.

An ASP version of the portal server can include a JSP execution environment that is available to module views, as depicted in FIG. 13. JSP files are manipulated via a Java servlet, a Sun Microsystems specification analogous to the CGI specification. The ASP version of the portal server can include a servlet host and JSP servlet to execute JSP files.

A JSP version of the portal server can also use this internal servlet host. Alternatively, the JSP version can use the web server's JSP servlet, by making a Servlet API call for inclusion of the module's HTML output within a web page being constructed.

8. Site Look-and-Feel, and Communities

Users of a portal web site typically belong to one or more user groups that are important to the portal provider. The user groups may constitute communities united by a special interest, common job role, common membership in a department or group, etc. Very commonly, the portal providers may want to create a different look to their sites for each of the different user groups. In other words, stylistic elements of the page can be varied depending on the user's group membership.

To provide for this facility, these general provisions are required:

1. a means of associating formatting intelligence with specific portions of a page, thus defining a style;

2. a way of associating a user group with the style;
3. a way of identifying which of a user's group memberships takes primacy in choosing styles.

Each of these provisions is addressed in the description to follow.

8.1. Styles and Templates

A "style" is a portion of software source code affecting the look-and-feel of a user interface. For styles to be useful, their code must be packaged in a way that makes them easy to administer and to include in a user display.

Since it is a portion of user interface source code, a style cannot be useful outside of a context. A "template" is a category to which a style can belong. Templates provide the context in which a style will be used. Templates also provide a means of retrieval for the currently selected style.

In an HTML-based implementation, styles and templates are the means by which a page can provide a different look-and-feel for different portions of the page and for different user groups.

The usefulness of styles and templates depends on how easy they are to create and to incorporate within a page. Both "templates" and "styles" can be created dynamically, as part of an administration user interface. This dynamic creation process involves the following general steps:

1. define the template, by describing it to the administrative user interface;
2. create the style's source code in a file, using whatever language and technique is appropriate to the deployment and to the types of templates to which the style will apply;
3. define the style in association with a template;
4. upload the style files to the portal web site.

Once a template has been created and has one or more styles associated with it, the styles can be retrieved for use in a page. Part of the API for the Template object includes methods for retrieving styles. Once retrieved, the API for the Style object allows the style to be executed, creating the desired portion of the user interface.

8.2. Style-to-group Mapping

Styles provide the means of delivering a particular look to a template. To support the notion that different user groups will have different styles, a style within the template's set can be identified as the desired style for a group. This can be made more sophisticated to allow defaulting to a style when the user's group does not explicitly have a style associated with it.

8.3. User Primary Group

Users can belong to multiple user groups. To create a look-and-feel tailored to the user's group membership, one approach is to choose one of the user's groups as the "primary user group". This group is the one used to select user interface look-and-feel, by asking the Template object to return the style associated with the user group.

To achieve this purpose, there must be some way of assigning the primary user group to the user, from among the set of groups to which the user belongs. For instance, an administrative user interface can include a way to flag one of the groups as "Primary".

Once the primary group has been chosen for the user, it can be used as the basis to make decisions. To support this, the API returns the primary group. In one implementation, the User object includes a method to return the user's primary group. Given the primary group, the portal web site can be written to exploit the style association with user group. For instance, the rule can be "for a given template, get the style associated with the user group, and execute the style."

8.4 Group-specific module layout

An important aspect of creating a site for a user community is the ability of the portal administrator to create pages whose modules are specific to that group. This can be supported by allowing each page to have module contents by group. The ability to add modules to pages can be made specific to a group.

8.5. Special Provisions for Delegated Administration

In a system which allows "delegated administration" where users other than a portal administrator have some control over the look and feel of a portal page, care must be given to what template definition and style definition capabilities are made available to delegated administrators, and how those templates and styles are allowed to be added to the web site. Since styles define actual pieces of code affecting the appearance of the web site, they should be treated as potential viruses, and subjected to source control as with the rest of the site.

Thus, while a portal administrator can add styles without restriction, and can make them live immediately, users acting as delegated administrators must be restricted so that they cannot introduce ill-behaved code. One way to accomplish this is to restrict what delegated administrators can add to the system to be only HTML, rather than JSP or ASP code. This restriction lessens the potential for serious harm to the server, but places no restriction on the content being added to the site's pages.

8.6. Viewing the End Result

Given the many provisions for an administrator to control the look-and-feel of a site by user group, and since users can belong to many different groups, an administrator can easily lose track of what the resulting portal site might look like to the end user. A solution to this problem is to give the administrator the ability to check out the end user site, by allowing them to quickly and easily "log in" as that user. This can be provided from the portion of the administrative interface that allows editing of the user record. This portion is only accessible to an administrator who necessarily has access to the user's login, so security is arguably not compromised by providing this access. A single button within the user editing pages can provide this access.

9. Administration

As discussed in previous sections, a useful feature of the portal server is a web-based administration tool that enables administrators to perform many tasks through simple browser actions. These tasks can include any or all of the following:

1—Adding module types to the web site and setting module properties
2—Performing user administration
3—Designing page layouts and styles for user groups, and defining system-wide defaults
4—Enabling or disabling the guest and user self-registration features
5—Reviewing the most recent log of portal server activity
6—Maintaining user groups and user group membership (version 2.0 and later)
7—Setting module and user permissions
8—Running various graphical utilities, such as one that sweeps obsolete data from the Data Storage object and database; one that diagnoses the current operating conditions of the portal; one that maps images to document mime types; one that explores the contents of the Data Storage object; and/or various utilities for setting up portal services.

9.2. Delegated Administration

A portal web site can be administered entirely by one or more portal administrators who have access to all the administration capabilities of the system. However, depending on the nature of the portal site and its user communities, this central administration can create a large workload for those administrators, and may violate privacy of some of the communities. A remedy to these problems is the ability to delegate specific portions of administration to trusted members of user communities.

Because modules are the portal server's means of distributing content in a controlled fashion to user communities, they can serve as an excellent basis for distributing administration capabilities to a subset of users. Specifically, modules can be written to provide certain administrative capabilities, and those modules can be assigned to user groups, so that only members of those user groups will have access to the modules. Typically, of course, the user group to which an administration module is assigned is carefully restricted to a very limited number of authorized users, but this decision is left to the portal administrator.

10. Summary

From the foregoing, it can be seen that the present invention provides an architecture for a portal server that offers a number of features and advantages. One such feature is its platform independence. The portal server can work with UNIX, Linux, and Windows NT, as well as with leading web servers, application servers, and databases. Further advantages lie in the fact that installation is rapid. An entire working portal can be up and running very quickly: in hours or days, rather than weeks or months that were required prior to the invention. Organizations can, at their own pace, change all aspects of the look-and-feel of the portal, integrate their own content, and use the portal server's development tools to extend out-of-the-box functionality. The portal server is preferably based on Java, JSP, JDBC, XML, and other standards-based technologies, thereby promoting integration with existing systems and reducing required learning time.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A portal server framework for providing a portal on a computer network, comprising:

a software class configured to instantiate an information object, the information object encapsulating information; and, a permission class configured to instantiate a first permission object, the first permission object defining a first set of users having access to, and a first set of administrative privileges associated with, the information object;

wherein the first set of administrative privileges includes permission to instantiate a second permission object, the second permission object defining a second set of users having access to the information object;

whereby, upon installation on the network, the classes are executable by a processor on the computer network.

2. The portal server framework of claim 1, further comprising a descriptor class configured to instantiate a descriptor object, the descriptor object defining a set of administrative properties associated with the information object.

3. The portal server framework of claim 1, further comprising a permission context class configured to instantiate a context object for each permission object, the permission context object defining the users and the privileges for the permission object.

4. The portal server framework of claim 1, wherein the second permission object defines a second set of users having access to, and a second set of administrative privileges associated with, the information object, wherein the second set of administrative privileges includes permission to instantiate a third permission object, the third permission object defining a third set of users having access to the information object.

5. A method of providing a portal server on a computer network, the method comprising:

providing a software class configured to instantiate an information object, the information object encapsulating information; and, providing a permission class configured to instantiate a first permission object, the first permission object defining a first set of users having access to, and a first set of administrative privileges associated with, the information object;

wherein the first set of administrative privileges includes permission to instantiate a second permission object, the second permission object defining a second set of users having access to the information object; and whereby the classes are executable by a processor on the computer network.

6. The method according to claim 5, further comprising providing a descriptor class configured to instantiate a descriptor object, the descriptor object defining a set of administrative properties associated with the information object.

7. The method according to claim 5, further comprising a permission context class configured to instantiate a context object for each permission object, the permission context object defining the users and the privileges for the permission object.

8. The method according to claim 5, wherein, the second permission object defines a second set of users having access to, and a second set of administrative privileges associated with, the information object, wherein the second set of administrative privileges includes permission to instantiate a third permission object, the third permission object defining a third set of users having access to the information object.

9. A computer program product for providing a portal server on a computer network, the computer program product comprising:

a computer readable medium; and, computer program instructions, recorded on the computer readable medium, executable by a processor, for performing the steps of:

instantiating an information object encapsulating information; and instantiating a first permission object, the first permission object defining a first set of users having access to, and a first set of administrative privileges associated with, the information object;

wherein the first set of administrative privileges includes permission to instantiate a second permission object, the second permission object defining a second set of users having access to the information object.

10. The computer program product according to claim 9, further comprising computer program instructions for performing the step of instantiating a descriptor object, the descriptor object defining a set of administrative properties associated with the information object.

11. The computer program product according to claim 9, further comprising computer program instructions for performing the step of instantiating a permission context object for each permission object, the permission context object defining the users and the privileges for the permission object.

12. The computer program product according to claim 9, wherein the second permission object defines a second set of users having access to, and a second set of administrative privileges associated with, the information object, wherein the second set of administrative privileges includes permission to instantiate a third permission object, the third permission object defining a third set of users having access to the information object.

* * * * *